US008237555B2

(12) United States Patent
McCarthy

(10) Patent No.: US 8,237,555 B2
(45) Date of Patent: Aug. 7, 2012

(54) HAZARDOUS VEHICLE ALERT SYSTEM AND METHOD BASED ON REACTION TIME, DISTANCE AND SPEED

(76) Inventor: Tom McCarthy, Freemont, CA (US)

( * ) Notice: Subject to any disclaimer, the term of this patent is extended or adjusted under 35 U.S.C. 154(b) by 379 days.

(21) Appl. No.: 12/577,111

(22) Filed: Oct. 9, 2009

(65) Prior Publication Data

US 2011/0084823 A1 Apr. 14, 2011

(51) Int. Cl.
*B60Q 1/00* (2006.01)

(52) U.S. Cl. ......... 340/435; 340/552; 340/907; 340/936

(58) Field of Classification Search ........................ None
See application file for complete search history.

(56) References Cited

U.S. PATENT DOCUMENTS 5,760,686 A * 6/1998 Toman .......................... 340/540
2006/0164222 A1* 7/2006 Nou .............................. 340/435
2007/0213883 A1* 9/2007 Clarke et al. ...................... 701/1

* cited by examiner

*Primary Examiner* — Sumati Lefkowitz
*Assistant Examiner* — Ieesha Gillis
(74) *Attorney, Agent, or Firm* — Craig A. Simmermon

(57) ABSTRACT

A hazardous vehicle alert system comprising a control module, a special graphical user interface, a speed and distance detector, and an alarm module where the user sets alarm triggers based on reaction time until potential impact from the hazardous vehicle. The user can assess the landscape, traffic patterns, and specifics of the task at hand to determine the required reaction time to take evasive maneuvers from the threat of on-coming hazardous vehicles and create alarm triggers to yield this reaction time. A software package is used to drive the graphical user interface, control module, alarm module, and detector module. The system includes modes ranging from one to four pieces and a mode that can be installed in a vehicle.

12 Claims, 6 Drawing Sheets

HAZARDOUS VEHICLE ALERT SYSTEM AND METHOD BASED ON REACTION TIME, DISTANCE AND SPEED

BACKGROUND OF THE INVENTION

1. Field of the Invention

This invention relates to an apparatus and method that notifies roadside work crews or other persons located near a roadway or highway to the approach of on-coming traffic that could collide with said persons thereby representing a significant risk of bodily harm to them. Specifically, the invention uses a control unit, a special graphical user interface coupled to the control unit, a speed and distance detection device coupled to the control unit, and an alert unit coupled to the control unit, where the invention can be programmed in the field by the crew to signal of on-coming vehicles with certain speed and distance characteristics to provide crews with the necessary reaction times to avoid injury. Reaction time is the amount of time before the on-coming vehicle will reach the crews or other designated location in the work zone. The control unit receives instructions from the graphical user interface and special software operated by a processor where the control unit in turn controls the other invention elements. The control unit signals the alert unit to start an alarm sequence when vehicles are within the specified threshold of characteristics.

2. Description of Related Art

There have been other roadside alert systems. The prior art that appears to be the closest in kind to this invention may be U.S. Pat. No. 5,760,686 by Toman. Toman discloses a system with an optical detection array for detecting physical entry of a hazardous vehicle when it crosses a leg of the array thereby entering a predefined work zone. The detection array is coupled to an optical alert device. Toman teaches an optical signaling alert and opposes an audible alert with rationale that work crews would not be able to hear an audible alarm due to work noise, where an optical alarm is otherwise more effective than an audible alarm. Toman also discloses an embodiment with a radar operated excessive speed detector that is preset to trigger an alarm when a vehicle exceeds the preset speed threshold. The detector would then signal the optical alarm to initiate when a vehicle surpasses the preset speed threshold.

The instant invention also discloses a type of radar operated excessive speed detector. In this case, a speed and distance detection device communicates with a control module, where the control module may signal an alarm based on data received from the speed and distance detection device. However, the speed and distance detection device of this invention does not simply detect speed; it is a combination speed and distance detector. The combination detector is required to yield a main aspect of this invention, which is the ability to trigger an alarm sequence according to reaction time and not simply according to speed of the hazardous vehicle.

The idea is that work crews can program the alarm to sound according the specific reaction times determined by the particular time required to notice a hazardous vehicle and then complete evasive measures to avoid being struck by the vehicle. Required reaction times may vary according the specific activity being conducted by the work crews. Thus, if a crew is performing a task that allows personnel to keep a fairly watchful eye on the roadway, such as flagging or surveying, the crew would require a relatively short reaction time, perhaps only 4 seconds, to take effective evasive maneuvers to avoid injury. On the other hand, if the crew is performing more involved roadwork work, such as repaving or repairing, that affords little attention to on-coming traffic, the crew would require much more reaction time, perhaps 12 seconds, to complete evasive maneuvers, such as dropping the shovel and exiting the work area, to avoid injury. We believe this invention is the first roadside alarm device that triggers according to road crew personnel reaction time and also allows the crews to program desired reaction times for the alert in a very user friendly manner.

BRIEF SUMMARY OF THE INVENTION

The invention comprises a control module, a special graphical user interface (GUI), a speed and distance detection device, an alert module, and at least one power source. The control module includes a processor, a data storage medium, and special software. Control module is coupled to the GUI, the speed and distance detection device, the alert module, and a power source. The GUI includes the ability to set reaction time until impact according to speed of vehicle and distance of vehicle. Optionally, the GUI includes inputs for alert type and alert volume. The GUI also may include the ability to record special message alerts.

The speed and distance detection device includes the ability to determine speed and distance of on-coming traffic with an operating range of at least 1500 feet in order to provide adequate notice and reaction time for those hazardous vehicles traveling at extremely excessive speeds such as 100 miles per hour.

The alert module is either an optical alarm or an audible alarm. An audible alarm is considered best mode.

One mode of the invention is packaged into a single unit where all elements can be connected to one power source or one power source system and the control unit is electrically coupled to the other main elements.

At the other extreme, main elements could be packaged separately, where each would require its own power source or power source system. Thus, the invention could be packaged in as many as four separate units where each has its own power source or power source system. In this case, the control module and all other main element packages would include a radio frequency transmitter and receiver to establish wireless coupling between the units and the control module.

There is a three-unit mode comprising: one unit with the control module coupled to the GUI with its own power source, one unit with the speed and distance detection device with its own power source, and one unit with the alert module with its own power source, where the control unit is coupled to the speed and distance detection device and the alert module by wireless coupling.

It is also an aspect of this invention to teach alerting persons located near a roadside work zone to hazardous vehicles entering the work zone comprising: the determination of required reaction time for a specific activity being conducted by the crews at a specific location, entering this required reaction time into the graphical user interface, appropriately aiming said speed and distance detection device at the appropriate work zone boundary, receiving notice of hazardous vehicles when such enter the work zone to provide sufficient notice to crews so that they may take effective evasive maneuvers, and the taking of such evasive maneuvers.

DEFINITION LIST

Figure 1:
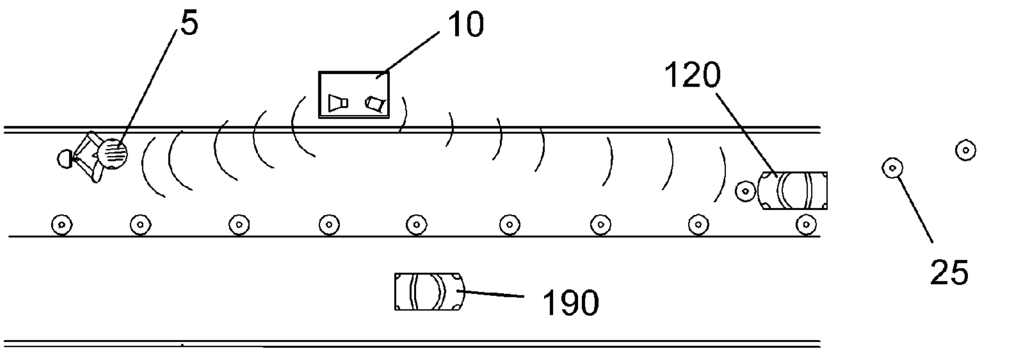
FIG. 1 is an aerial view of the invention, in single-unit mode, placed in a roadside work zone, in order to alert personnel of hazardous vehicles in a designated work zone.
Figure 2:
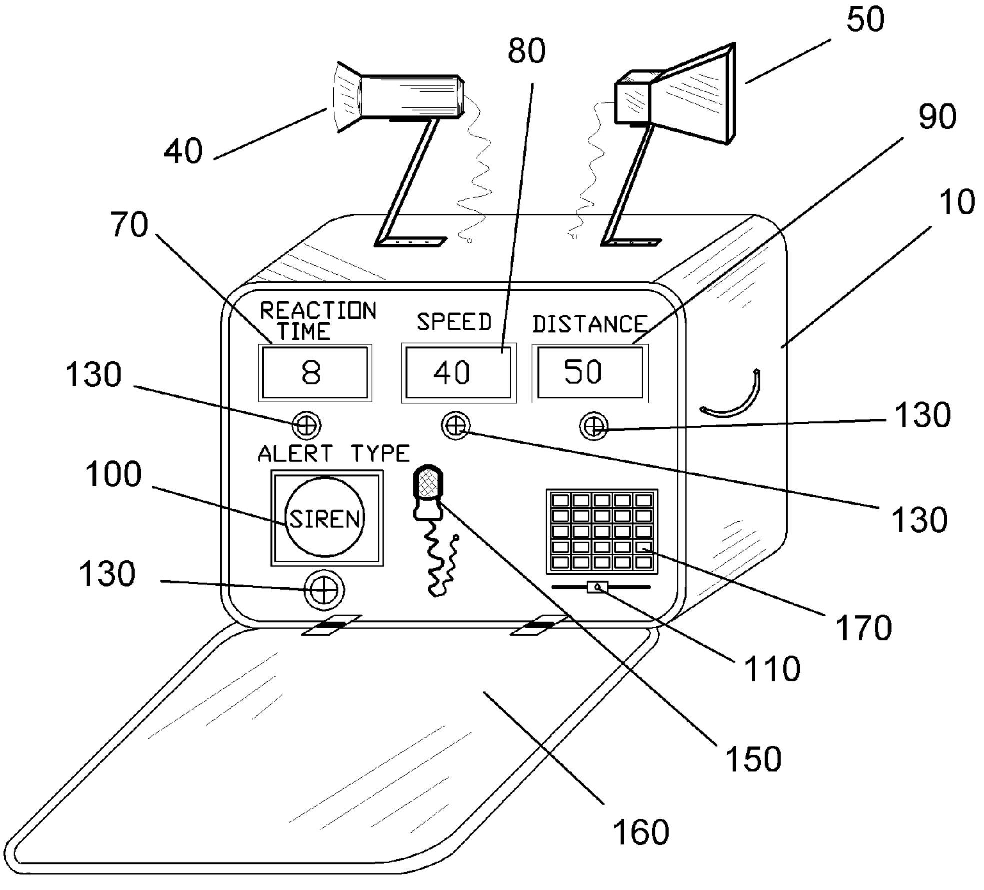
FIG. 2 is a perspective view of the invention in single-unit mode with the case open to display main aspects of the special graphical user interface.
Figure 3:
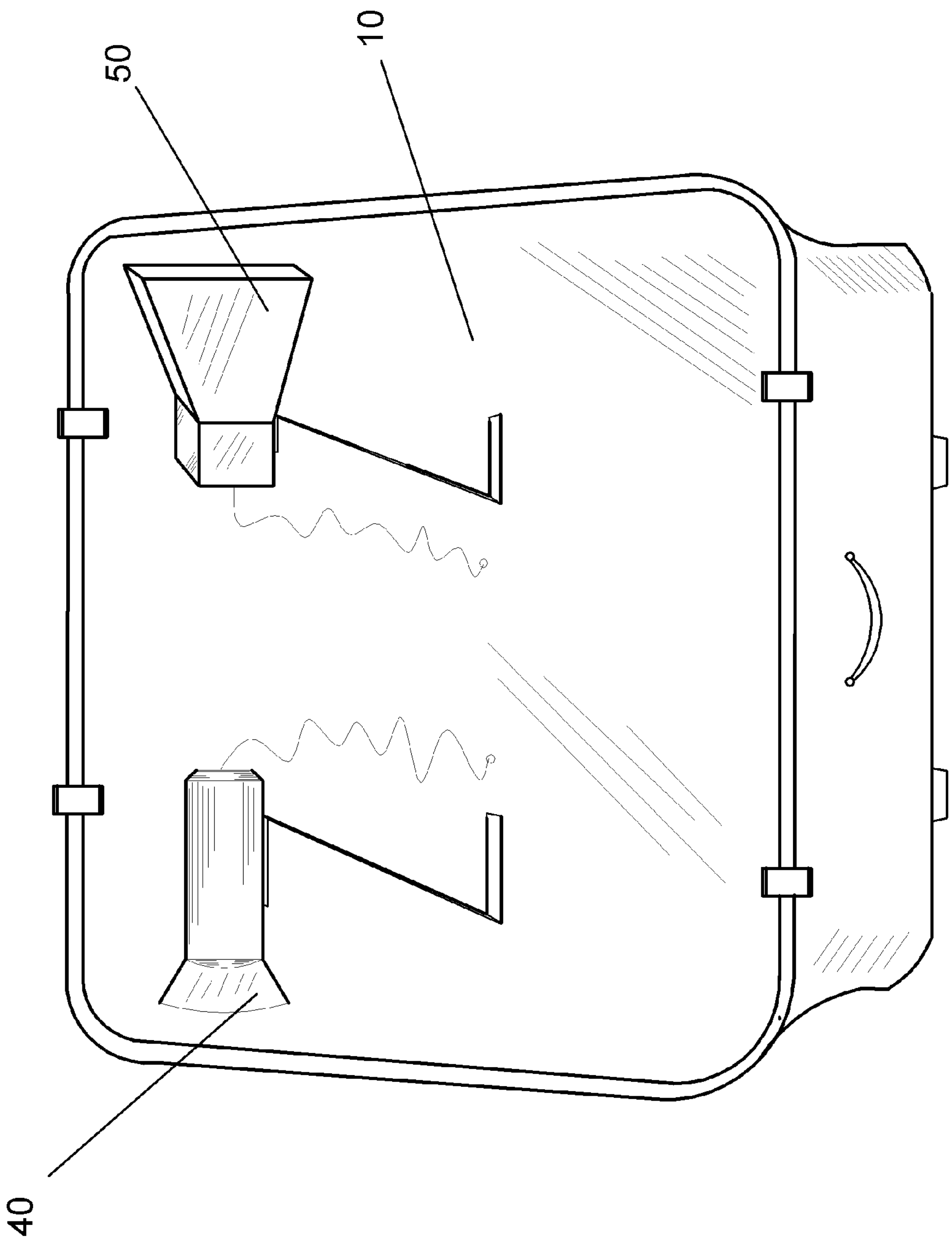
FIG. 3 is a perspective view of the invention in single-unit mode with the case shut as would be the case under normal operation.
Figure 4:
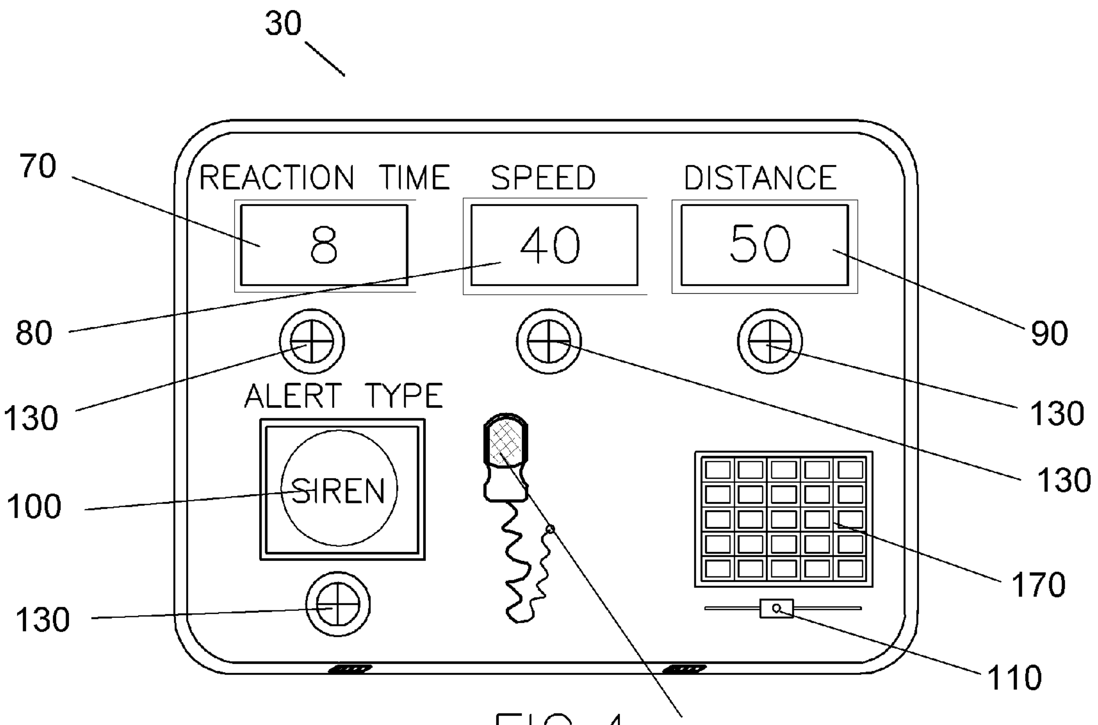
FIG. 4 is a blow-up view of the main features included with the special graphical user interface.
Figure 5:
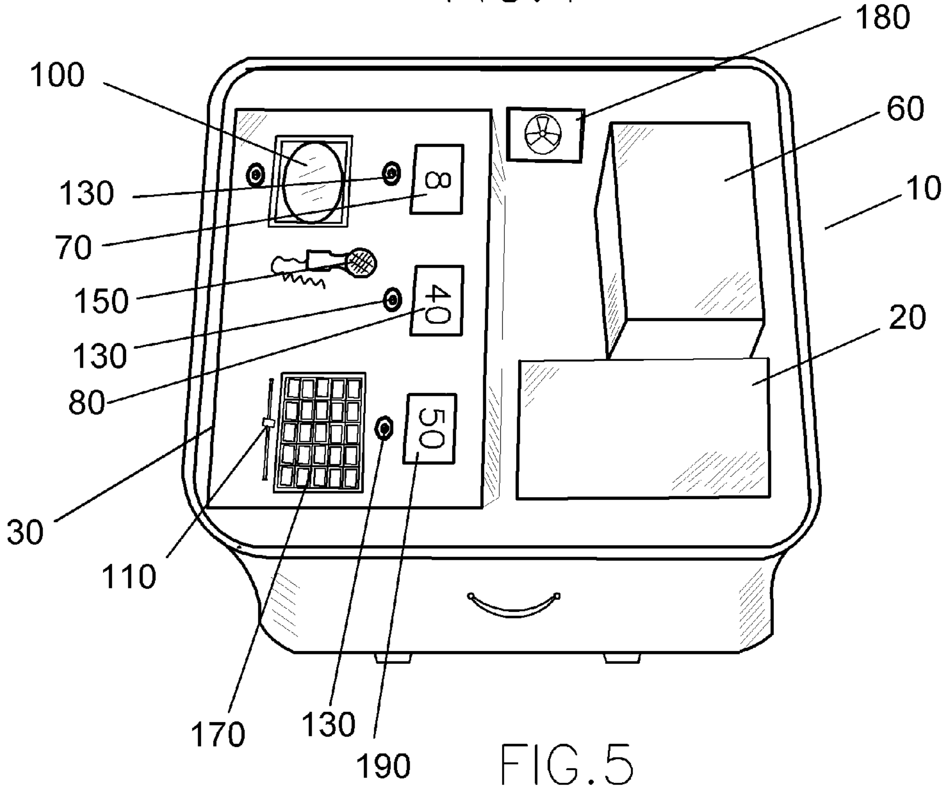
FIG. 5 is a blow-up view of the invention in single-unit mode with cover panels removed to depict internal elements that may be optionally included with the invention.

| Term | Definition |
|---|---|
| 5 | Human with shovel |
| 10 | Hazardous vehicle alert system in single unit mode |
| 15 | Hazardous vehicle alert system in cart mode |
| 20 | Control module |
| 25 | Orange cone or similar designating work zone boundary |
| 30 | Special graphical user interface (GUI) |
| 40 | Speed and distance detection device |
| 50 | Alert module |

-continued

| Term | Definition |
|---|---|
| 60 | At least one power source |
| 70 | Required reaction time input/setting on GUI |
| 80 | Minimum vehicle speed input/setting on GUI |
| 90 | Minimum vehicle distance input/setting on GUI |
| 100 | Alert type setting input/setting on GUI |
| 110 | Alert volume setting input/setting on GUI |
| 120 | Hazardous vehicle in work zone |
| 130 | Dial to raise or lower designated data field |
| 140 | Select button with up, down, left, right, select, and deselect |
| 145 | Hand-held unit containing 20, 30, and 60 |
| 150 | Microphone on GUI |
| 160 | Protective case |
| 170 | Accessory keypad on GUI |
| 180 | One or more cooling fans |
| 190 | Vehicle traffic outside the work zone |
| 200 | Wheels on cart |
| 210 | AC power generator |
| 220 | DC batteries |
| 230 | Window in cart |

DETAILED DESCRIPTION OF THE INVENTION

The invention 10 comprises: a control module 20, a special graphical user interface (GUI) 30, a speed and distance detection device 40, an alert module 50, and at least one power source 60. Control module 20 comprises: a processor, a data storage medium, and special software. The software comprises a series of custom applications that control the GUI 30 through electrical connection, and control the speed and distance detection device 40, and the alert module 50 through electrical or radio frequency connections.

A significant portion of the software drives the GUI 30. This application provides for user friendly operation where the required reaction time 70, minimum vehicle speed 80, minimum distance 90, alert type 100, and alert volume 110 may be quickly entered into the GUI 30 by the user. For instance, the user may first determine that he requires about 10 seconds of reaction time in order to successfully take protective cover from on-coming hazardous vehicles 120 in the construction zone. He could then dial in 10 seconds on the required reaction time 70 portion of the GUI 30.

This could be accomplished by a simple mechanical dial 130; other type of variable electro-mechanical switch, or the like; a touch screen device with GUI screen with scroll buttons and select buttons for the user to enter and read data where the GUI is created by special software loaded in the data storage medium; a screen device with a mouse or keyboard or both used to enter/read data on a GUI page where the user clicks select buttons on and off, along with save, and cancel commands buttons where the GUI is created by special software loaded in the data storage medium; a hand-held unit 145 housing the control module 20, GUI 30, and power source 60 with a physical select button 140 similar to that on a television remote control with left, right, up, down, and press button capability, or similar, used to scroll through at least: the required reaction time 70, the minimum vehicle speed 80, and the minimum distance 90 with left and right buttons perhaps, and the adjusting of these fields with up and down buttons perhaps, and select and deselect with subsequent button presses, with at least one screen to display at least one data field and allow adjustment of the data field which would be the GUI element, where the GUI is created by special software loaded in the data storage medium, which also lies in the hand-held unit 145; or the like.

After required reaction time 70 is set, the user could then enter either a minimum vehicle speed 80 or a minimum distance 90. As one of these two parameters is adjusted, the other necessarily adjusts on the GUI as well. This is because the three main parameters: required reaction time 70, minimum vehicle speed 80, and minimum distance 90 form the linear relationship:

[minimum distance]=[required reaction time]×[minimum vehicle speed].

Additionally, the GUI application is designed to hold constant the most prior adjusted parameter between these three parameters. As stated above, the required reaction time was just previously set for 10 seconds. Thus, while this parameter is held constant, when the minimum vehicle speed data field 80 is increased by the user, the display data field for minimum distance 90 also increases, because of the relationship stated above. As commanded by the special software loaded on the data storage medium, data fields 70, 80, and 90 in GUI 30 are continuously updated, subject to the rule above, and displayed on the GUI 30.

This is a main aspect of the invention. It is believed that this arrangement will significantly contribute to a reduction in roadside injuries. Crews or other persons located near a roadway can easily set up the invention, visually inspect the boundaries of the work zone, aim the invention accurately within the boundaries, see with their own eyes the distance of notification in their foreground that would be require to yield sufficient reaction time to avoid injury, judge for themselves, taking into account their own personal situations, painting an image in their mind, as it were, for them to see exactly where they would need notification of an on-coming vehicle to avoid injury. The mental image produced from operating the invention may instill behavior in the crews with more thought towards safety. The practice of this invention by the crews will yield better notification of hazardous vehicles while giving them a hands-on approach to protecting themselves, which in turn may promote awareness of safety and better safety practices.

Moving back to the example, after the required reaction time 70 is set, the user may choose to be notified at a certain minimum distance 90 or at a certain minimum speed 80. In either case, the other parameter would be automatically calculated and set by the GUI application. After the second main parameter is set, the user could continue to adjust the third. Thus, if the user were to then manually adjust the third parameter, rather than allowing the software application to set it automatically, the required reaction time 70 would then automatically adjust because this was the "oldest" manual adjustment of the three main parameters. The three parameters could effectively be continuously adjusted by the operator until he feels comfortable with the designated required reaction time 70, minimum vehicle speed 80, and minimum distance 90 that the physics at hand can afford to offer. The setting would then be saved or set in the control module.

At this point, the alarm module 50 would sound if a vehicle 120 entered the field of operation of the detection device 40 at the designated minimum vehicle speed 80 or greater while passing through the designated minimum distance 90 from the detector 40. An example of data used in a typical application appears in FIG. 11. User 5 assessed the local terrain, traffic patterns, person situation, and the like, and determined that he would require a reaction time of 10 seconds in the particular case. In addition, the user determined that he wanted a minimum of 500 feet notice of a vehicle approaching his position and set minimum distance 90 on the GUI 30 at 500 feet. Control module 20 then set the detection speed at 34 miles per hour, which would yield 10 seconds notice at 500 feet. The alarm sequence would then start when an on-coming vehicle came within 500 feet of the user 5 or the detection device 40, traveling at 34 miles per hour or greater.

The speed and distance detection device 40 includes the ability to determine speed and distance of on-coming traffic with an operating range of at least 1500 feet in order to provide adequate notice and reaction time for those hazardous vehicles traveling at extremely excessive speeds such as 100 miles per hour. Additionally, speed and distance detection device 40 includes the ability to use a conical-shaped send and capture operational zone. The conical shaped active zone is necessary to measure work zone areas because they are typically long and narrow areas. The operational cone shape would be aimed by the operator so that one leg of the cone tip aligns with the boundary between the work zone and non-work zone where traffic is allowed to freely pass beyond this boundary.

The invention can be easily and accurately aimed. Detection device 40 is mounted on an adjustable base. The user can set distance 90 to operate in a plain where traffic may freely pass. User can then aim detector 40 at traffic 190 sufficiently until traffic is detected. Then the user may slowly adjust the aim of the detector 40 away from traffic 190 and towards traffic 120 just until traffic 190 is just not detected in the conical measuring area of the detector 40. At this point, there exists a good correlation between the detector 40 boundary edge of the cone shape and the boundary of the work zone. When aimed properly, the speed and distance detection device 40 can operate in a narrow detection operational field, which is required because of the long narrow shape of roadside work zones. This allows traffic 190 outside of the work zone to pass by without activating the alarm 50, while traffic 120, just one lane away, will activate the alarm 50.

Control module 20 is controllably coupled to: GUI 30, speed and distance detection device 40, and alert module 50. This coupling can be accomplished by hard wire connections such as one or more two-way serial port connections or by a two-way radio frequency wireless connection such as a Bluetooth or a WiFi connection. The control module 20 sends commands to and receives messages from the speed and distance detection device 40 and alert module 50 directly with each. An typical message received by the control module 20 from the speed distance detection device 40 might be a speed measurement of a vehicle passing through the minimum distance plain. Control module 20 also sends and receives commands from the GUI 30. The control module 20 receives and stores all values set by the GUI 30 and uses these values to send commands to the detection device 40. When the control module 20 receives speed measurement signals from the detection device 40 at or above the minimum speed 80 set by the GUI 30 at distance 90, it signals the alarm 50 to start a sequence.

The control module 20 is also coupled to the at least one power source 60. The control module could be powered by direct current or alternating current. In either case, the connection would consist of a positive wire connection and a negative (or ground) wire connection between the power source 60 and the control module 20. Power is required by this module to operate the processor and storage media which together run the software applications described throughout.

GUI 30 may also include a microphone 150. Microphone 150 can be used by the user to record special message alerts. GUI 30 includes record, stop, and delete command buttons that are used to record a special message by the user, such as "Slow Down! You are speeding through a construction zone." The user could then switch alert type 100 to "pre-recorded" so that this message would act as the alarm sequence and play when the alarm is triggered. GUI 30 may optionally include a keypad 170 which can be used to control non-essential operations.

Alert module 50 may be either an optical alarm or audible alarm. An audible alarm is considered the best mode because applicant believes audible alarms provide more notice. Most work crews operate during the day when optical alarms are typically hard to notice. Also one has to be facing the optical alarm in order to notice it, and this may be impractical in many work crew scenarios. In best mode, the user has the option to set audible alarm as: a siren, a special recorded message, or a preset computer or artificial voice. The optical alarm is a series of strobe lights or continuously burning lights.

In the single-unit mode, control module 20, GUI 30, speed and distance detection device 40, alert module 50, and the at least one power source 60 are all contained in one protective case 160. This mode is depicted in FIGS. 1-5. The at least one power source 60 in this mode typically consists of one or more DC batteries. The batteries may optionally be connected to an inverter to yield AC electrical current to power other main elements such as the control module 20 or the GUI 30. Alternatively, the inverter could be left out to yield DC current power to all modules. Optionally, in single-unit mode, the at least one power source 60 could include a battery charger where the charger is coupled to an AC electrical current connection such as a standard 110 VAC connection where the charger then charges the batteries or otherwise indirectly powers the invention. Optionally, in single-unit mode 20 or cart mode 15, one or more cooling fans 180 may be added to the invention which would also be coupled to the at least one power source. Optionally, in single unit mode 20 or cart mode 15, a light signaling that the invention is powered up and operational may be added to the invention which would also be coupled to the at least one power source. The light would appear on the outside surface of the protective case 160.

In the single unit mode, the control module 20 and GUI 30 may take the form of a laptop computer installed inside of the protective case 160. Thus, the software would be installed in the laptop memory and operate through the laptop processor which would operate as the control module 20. The laptop screen would operate as the GUI 30 with user input conducted through the laptop keyboard or laptop mouse or both.

Figure 6:
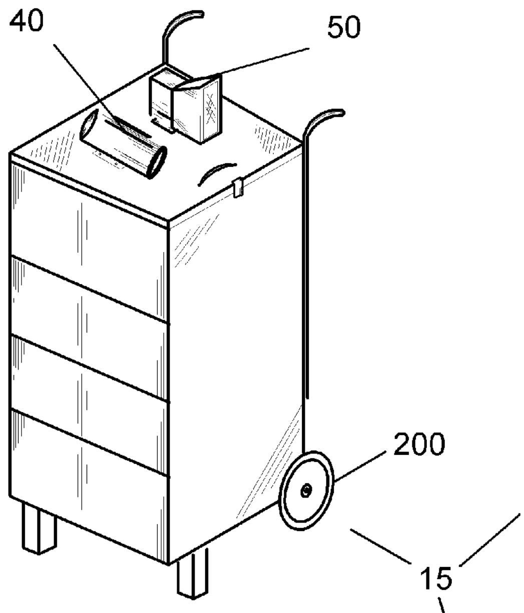
FIG. 6 is a perspective view of the invention in cart-mode with the speed and distance detection device and alert module placed on top of the cart.
Figure 7:
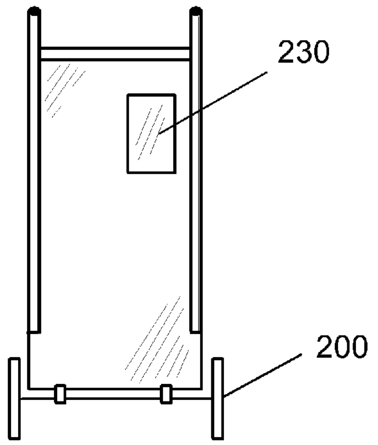
FIG. 7 is a rear view of the invention in cart-mode depicting an optional window in the cart housing that may be used by the speed and distance detection device or the alert module or both, so that these elements may be mounted inside of the cart while using such windows to perform their necessary functions while mounted inside of the cart.
Figure 8:
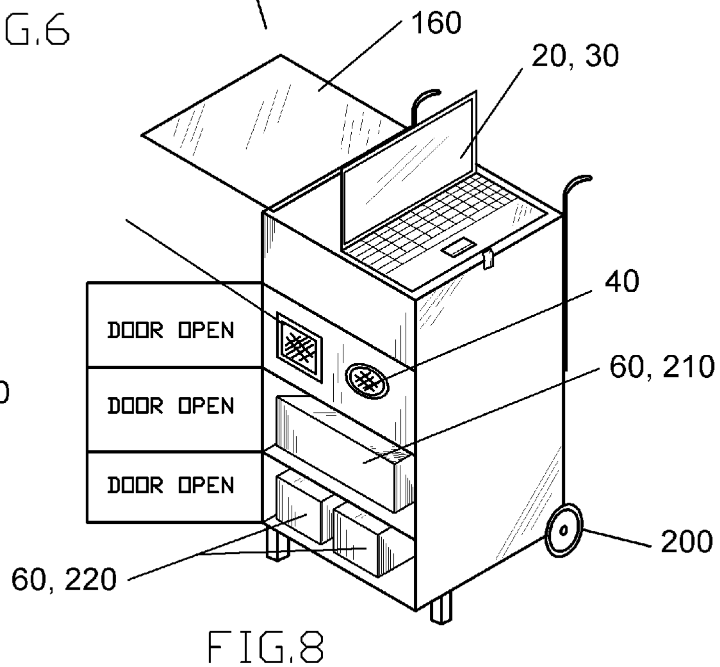
FIG. 8 is a perspective view of the invention in cart-mode. Sheet 4 depicts the invention in cart-mode with a laptop computer being used for the special graphical user interface where the special software to yield the special graphical user interface is installed on the laptop computer and appear on the laptop computer screen. Sheet 5 depicts the invention in cart-mode with the special graphical user interface installed into the top of the cart.

In cart mode, control module 20, GUI 30, speed and distance detection device 40, alert module 50, and the at least one power source 60 are all contained in one protective case 160. This mode is depicted in FIGS. 6-8. In cart mode, the invention sits on wheels 200 so that it can be moved around more easily than the single-unit version. In cart mode, at least one power supply 60 may optionally include a gasoline or diesel AC current generator 210 that can be used to power the invention or to charge one or more DC batteries 220 when generator 210 is coupled to a DC charger. Cart-mode may optionally include one or more windows 230 in the protective case 160 so that speed and distance detection device 40 or alert module 50 or both may function while installed inside of the protective case 160.

There is also a vehicle mode (not depicted) where control module 20 and GUI 30 can be installed in the interior of vehicle such as a pickup truck or other utility vehicle, or optionally be installed into one hand-held unit 145, while the speed and distance detection device 40 is mounted on the exterior of the vehicle on one end of the vehicle with the alert module 50 mounted on the other end of the vehicle. In this mode the at least one power source 60 would be provided by the vehicle battery and vehicle alternator system. This mode is convenient to use because the invention is installed in the vehicle so no hand movement of the apparatus would be required. The user can simply drive the vehicle to the desired location for hazardous vehicle detection and start the alert system without elaborate set-up and without need for extraneous power sources.

Figure 9:
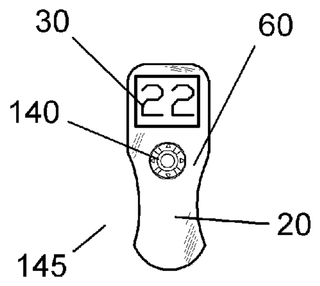
FIG. 9 is a front view of the special graphical user interface in three-unit mode. In this mode, the GUI and control module are combined in the same hand-held unit which has its own power source. This unit would be coupled by a radio frequency connection to the other main elements depicted in FIG. 10.
Figure 10:
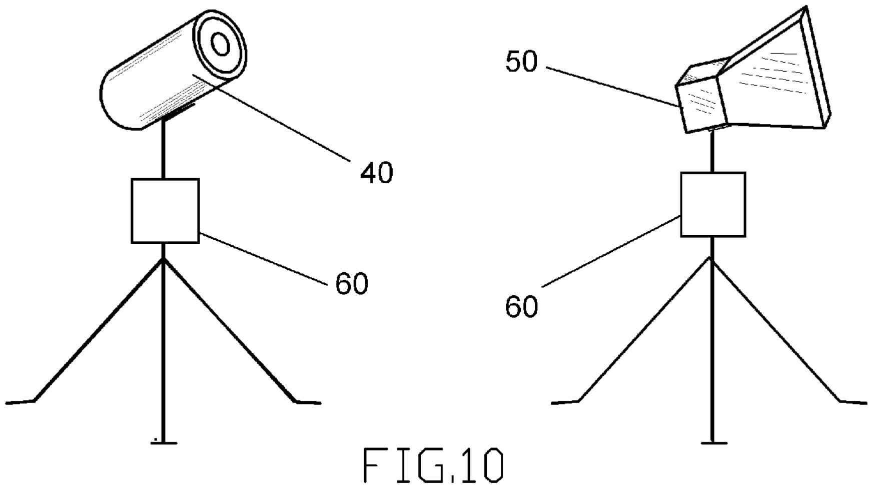
FIG. 10 includes perspective views of the speed and distance detection device with separate power source and the alert module with separate power source in three-unit mode. These units would be coupled by radio frequency connection to the control module and GUI depicted in FIG. 9.

In three-unit mode, the control module 20 and GUI 30 are packaged into one hand-held unit 145 as depicted in FIG. 9. Control module 20 and GUI 30 are electrically coupled within the hand-held unit 145. In this mode, the hand held unit has its own power source in the form of a DC battery. The hand-held unit 145 includes a screen 30 capable of displaying numbers and headings. The user could pan through settings for time 70, speed 80, distance 90, alert type 100, alert volume, etc. and select and adjust parameters with hand-held unit 145. The processor, storage medium, and software are located in hand-held unit 145. Control module 20 is wirelessly coupled to the speed and distance detection device 40 and alert module 50. Speed and distance detection device 40 and alert module 50 are each housed in separate units with individual power supplies 60 as depicted in FIG. 10. This mode has benefit for long-range detection or detection of hazardous vehicles 120 at relatively long distances from the work crews 5. The detector 40 can be placed several hundred feet from the hand-held unit 145 and alert module 50. Thus, with this mode, detection of vehicles can be made at a long distance from the crew while the alarm module can still be located relatively close to the crew so that the alarm is sure to be taken notice of by the crew.

The best mode radio frequency coupling between the hand-held unit 145 and detector unit 40 and alarm unit 50 is Bluetooth protocol. Bluetooth uses adaptive frequency hopping which reduces interference between wireless technologies sharing the 2.4 GHz spectrum. This is done by detecting other devices in the spectrum and avoiding the frequencies they are using. Bluetooth has a maximum range of about 100 meters.

Figure 11:
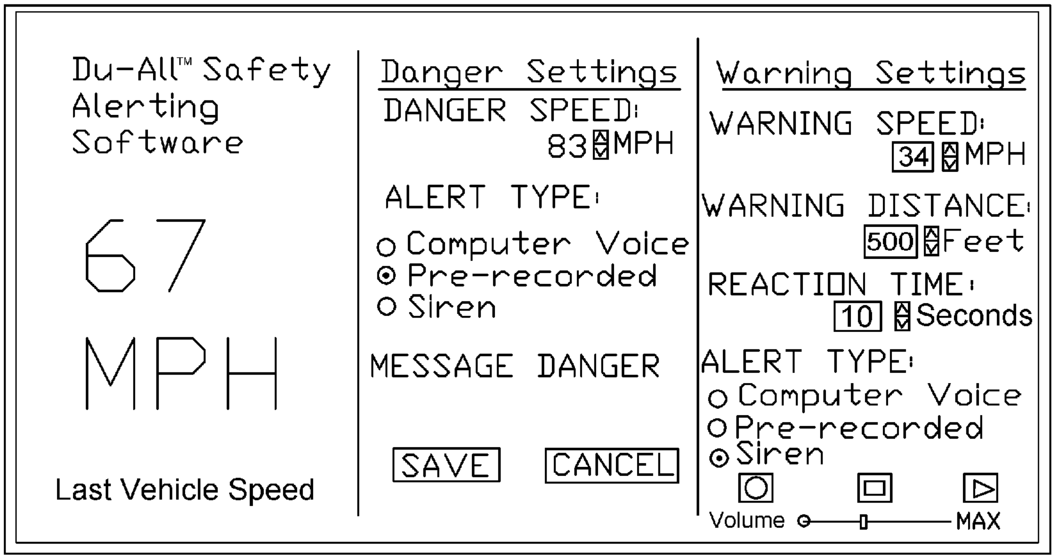
FIG. 11 is a blow-up view of a mode of special graphical user interface with two parameter input fields. In this mode, the user may enter one speed and distance alarm trigger, which triggers the alarm according to normal procedure described below, as well as one danger speed setting which triggers the alarm at this danger speed at all distances of operation.

Best mode GUI 30 includes two warning settings as depicted in FIG. 11. The first setting, labeled Warning Setting, is the same as discussed above, where a reaction time 70 is chosen along with a minimum distance 90 or speed 80 to deliver a proper warning yielding the required reaction time 70. Thus, the GUI in FIG. 11 is set to provide 10 seconds lead time for vehicles entering the work zone at 500 feet away traveling at 34 miles per hour or faster. At the same time, there is another alarm set to sound when any vehicle enters the work zone traveling at 83 miles per hour or faster. This second setting, labeled Danger Setting, is triggered at all distances from detector up to the limit of the detection range of the detector for all vehicles approaching at 83 miles per hour or faster.

In all modes, power supply 60 may optionally include one or more photovoltaic cells or solar panels where the solar panels act as a battery charger to charge DC batteries incorporated into power supply 60.

Figure 12:
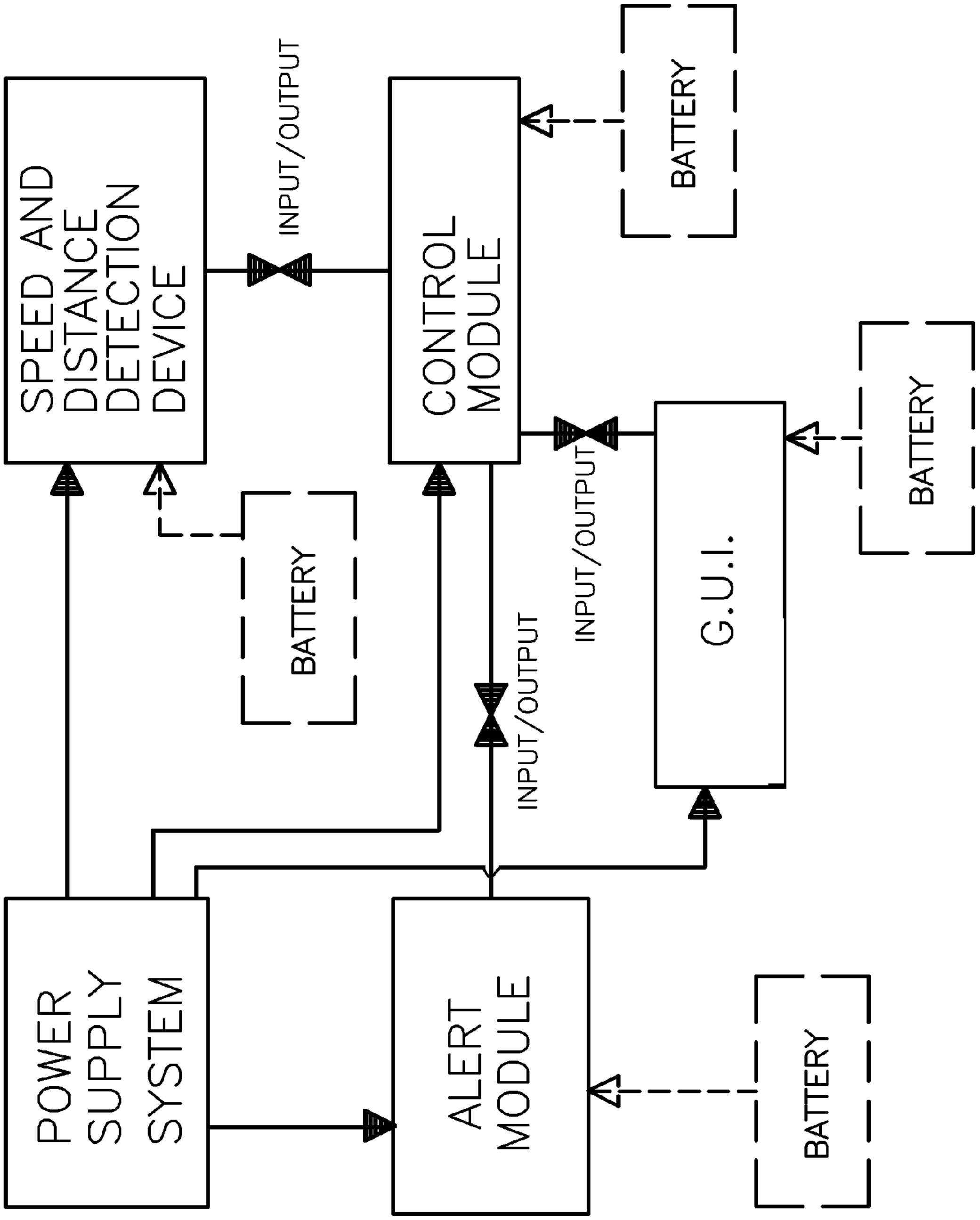
FIG. 12 is a circuit diagram of the main elements of the invention. In single unit mode, main elements may share one power source, as indicated by solid line connections. Alternately, when main elements are packaged separately, they are power by separate power source batteries as indicated by dotted line connections.

FIG. 12 is a circuit diagram of major elements of the invention. The control module is controllably coupled to alert module, GUI, and speed and distance detection device. This coupling is a two-way data stream connection. The control module is electrically coupled to a power source. Alert module, GUI, and speed and distance detection device are electrically coupled to a power source. Power sources can be alternating current or direct current nature.

What is claimed is:

1. A hazardous vehicle alert system comprising:

a control module, comprising: a processor, a data storage medium, and a software package;

a graphical user interface, comprising: at least one display screen, at least one hand operated control, a required reaction time input, a minimum vehicle speed input, and a minimum vehicle distance input, a vehicle speed and distance detection device with an operating range of at least 1500 feet and a conical-shaped send and capture operational zone;

an alert module; and at least one power source, wherein said control module is controllably coupled to said graphical user interface, said vehicle speed and distance detection device, and said alert module, and electrically coupled to said at least one power source, said graphical user interface, said vehicle speed and distance detection device, and said alert module are electrically coupled to said at least one power source, said software package is installed on said data storage medium and produces said graphical user interface on said at least one display screen, where said inputs may be adjusted with said at least one hand operated control, with data transfer essentially continuously flowing between said graphical user interface and said data storage medium through said processor, which executes a set of instructions contained in said software package, said instructions including the continuous update of required reaction time input, said minimum vehicle speed input, and said minimum vehicle distance input in said graphical user interface according to the relationship: said reaction time input=said minimum vehicle distance input/said minimum vehicle speed input, where the most prior adjusted input parameter between said three input parameters is held constant during said continuous recalculation, where the most prior adjusted input parameter is a rolling designation as input parameters are iteratively adjusted, until the final said three input parameters is chosen by the user and saved into said control module, said control module sends commands to said vehicle speed and distance detection device for it to report back to said control module with the actual vehicle speed of detected vehicles at designated said minimum vehicle distance location; and in response to said speed reports from said vehicle speed and distance detection device to said control module, said control module sends commands to said alert module to start an alert process when it receives vehicle speed measurements at or above said minimum vehicle speed at said minimum vehicle distance, thereby alerting personnel to hazardous vehicles.

2. A hazardous vehicle alert system as recited in claim 1 wherein said graphical user interface further comprises an alert type input designation, comprising: a siren option, a special recorded message option, and a computer voice option, wherein this particularly chosen alert type is started by the alert module when said control module commands such.

3. A hazardous vehicle alert system as recited in claim 1, wherein said graphical user interface further comprises an alert volume control, wherein the volume of the alarm signaled by said alert module can be adjusted according to said alert volume control, where such process is controlled by the commands originating in said control module.

4. A hazardous vehicle alert system as recited in claim 1 wherein said graphical user interface further comprises a second minimum vehicle speed input, wherein said control module receives said second minimum vehicle speed input and sends commands to said vehicle speed and distance detection device to report back with the actual vehicle speed of any detected vehicles at all measurable distances of said vehicle speed and distance detection device;

said control module sends commands to said alert module to start an alert process when the actual vehicle speed meets or exceeds said second minimum vehicle speed, thereby alerting personnel to hazardous vehicles.

5. A hazardous vehicle alert system as recited in claim 1 wherein said at least one power source further comprises:

one or more direct current batteries; and a battery charging device, wherein said battery charging device charges said one or more batteries, said battery charging device consisting of:

an alternating current battery charger and an alternating current power supply input, such as a standard 110 VAC line, coupled thereto, an alternating current battery charger and a gas or diesel powered alternating current power generator coupled thereto, one or more photovoltaic cells coupled to said one or more direct current batteries, or a vehicle alternator system that is used to charge the vehicle battery.

6. A hazardous vehicle alert system as recited in claim 1, 2, 3, 4 or 5 wherein all said elements are housed:

in one protective case, sized to be able to be held and easily positioned by an average-sized person; or in one protective wheel cart case with wheels on its bottom end to enable said wheel cart case to be easily moved and positioned by an average-sized person.

7. A hazardous vehicle alert system as recited in claim 1, 2, 3, 4 or 5, wherein said control module and said graphical user interface are installed in the interior of a vehicle such as a pickup truck or vehicle, or optionally installed into a hand-held unit, said vehicle speed and distance detection device is mounted on the exterior of the vehicle at one end, said alert module is mounted on the exterior of the vehicle at the other end, and said at least one power source is the vehicle battery along with the vehicle alternator system.

8. A hazardous vehicle alert system as recited in claim 1, 2, 3, 4 or 5, wherein said control module and said graphical user interface are packaged into one hand-held unit, wherein said hand held unit further comprises:

a separate power source in the form of a direct current battery, a display screen capable of displaying numbers and headings, a select button capable of button up, button down, button left, button right, and button press electrical switching, a radio frequency transmitter and receiver, said vehicle speed and distance detection device is package into a separate unit wherein said unit further comprises:

a separate power source, and a radio frequency transmitter and receiver, said alert module is package into a separate unit wherein said unit further comprises:

a separate power source, and a radio frequency transmitter and receiver, wherein said control unit is wirelessly controllably coupled, through said radio frequency transmitters and receivers, to said graphical user interface, said vehicle speed and distance detection device, and said alert module.

9. A method of alerting persons located near a roadside work zone to hazardous vehicles entering said roadside work zone comprising:

setting up said a hazardous vehicle alert system as recited in claim 1, 2, 3, 4 or 5 at a position that is upstream in terms of traffic flow from said roadside work zone;

aiming said vehicle speed and distance detection device so that one leg of the point of said conical send and capture operational zone of said vehicle speed and distance detection device coincides with the boundary between said roadside work zone and the non-work zone area where traffic may freely travel;

determining a reaction time required to take evasive maneuvers from a speeding vehicle traveling through said roadside work zone;

determining a distance at which it would be prudent to notice or discover a speeding vehicles traveling through said roadside work zone, or, alternatively, determining a speed at which it would be prudent to notice or discover a speeding vehicles traveling through said roadside work zone;

entering said reaction time and said distance or said speed into said graphical user interface; and being notified with an alarm sequence of a vehicle traveling through said roadside work zone when said vehicle is at said distance, traveling at said speed or faster.

10. A method of alerting persons located near a roadside work zone to hazardous vehicles entering said roadside work zone comprising:

setting up said a hazardous vehicle alert system as recited in claim 6 at a position that is upstream in terms of traffic flow from said roadside work zone;

aiming said vehicle speed and distance detection device so that one leg of the point of said conical send and capture operational zone of said vehicle speed and distance detection device coincides with the boundary between said roadside work zone and the non-work zone area where traffic may freely travel;

determining a reaction time required to take evasive maneuvers from a speeding vehicle traveling through said roadside work zone;

determining a distance at which it would be prudent to notice or discover a speeding vehicles traveling through said roadside work zone, or, alternatively, determining a speed at which it would be prudent to notice or discover a speeding vehicles traveling through said roadside work zone;

entering said reaction time and said distance or said speed into said graphical user interface; and being notified with an alarm sequence of a vehicle traveling through said roadside work zone when said vehicle is at said distance, traveling at said speed or faster.

11. A method of alerting persons located near a roadside work zone to hazardous vehicles entering said roadside work zone comprising:

setting up said a hazardous vehicle alert system as recited in claim 7 at a position that is upstream in terms of traffic flow from said roadside work zone;

aiming said vehicle speed and distance detection device so that one leg of the point of said conical send and capture operational zone of said vehicle speed and distance detection device coincides with the boundary between said roadside work zone and the non-work zone area where traffic may freely travel;

determining a reaction time required to take evasive maneuvers from a speeding vehicle traveling through said roadside work zone;

determining a distance at which it would be prudent to notice or discover a speeding vehicles traveling through said roadside work zone, or, alternatively, determining a speed at which it would be prudent to notice or discover a speeding vehicles traveling through said roadside work zone;

entering said reaction time and said distance or said speed into said graphical user interface; and being notified with an alarm sequence of a vehicle traveling through said roadside work zone when said vehicle is at said distance, traveling at said speed or faster.

12. A method of alerting persons located near a roadside work zone to hazardous vehicles entering said roadside work zone comprising:

setting up said a hazardous vehicle alert system as recited in claim 8 at a position that is upstream in terms of traffic flow from said roadside work zone;

aiming said vehicle speed and distance detection device so that one leg of the point of said conical send and capture operational zone of said vehicle speed and distance detection device coincides with the boundary between said roadside work zone and the non-work zone area where traffic may freely travel;

determining a reaction time required to take evasive maneuvers from a speeding vehicle traveling through said roadside work zone;

determining a distance at which it would be prudent to notice or discover a speeding vehicles traveling through said roadside work zone, or, alternatively, determining a speed at which it would be prudent to notice or discover a speeding vehicles traveling through said roadside work zone;

entering said reaction time and said distance or said speed into said graphical user interface; and being notified with an alarm sequence of a vehicle traveling through said roadside work zone when said vehicle is at said distance, traveling at said speed or faster.

* * * * *